United States Patent [19]

Pascon et al.

[11] 4,360,576
[45] Nov. 23, 1982

[54] LEAD ACCUMULATOR

[75] Inventors: Claude Pascon, Le Plessis-Robinson; Georges Marcellin, Vigneuse sur Seine, both of France

[73] Assignee: Societe Anonyme dite: Compagnie Generale d'Electricite, Paris, France

[21] Appl. No.: 230,960

[22] PCT Filed: Jun. 30, 1980

[86] PCT No.: PCT/FR80/00104

§ 371 Date: Mar. 4, 1981

§ 102(e) Date: Jan. 15, 1981

[87] PCT Pub. No.: WO81/00176

PCT Pub. Date: Jan. 22, 1981

[30] Foreign Application Priority Data

Jul. 4, 1979 [FR] France ............................. 79 17384

[51] Int. Cl.$^3$ .............................................. H01M 2/18
[52] U.S. Cl. ....................................... 429/143; 429/146
[58] Field of Search ............... 429/143, 145, 146, 147, 429/72, 81, 217, 142

[56] References Cited

U.S. PATENT DOCUMENTS

| 2,004,304 | 6/1935 | Wells | 429/147 X |
|---|---|---|---|
| 2,422,130 | 6/1947 | Proctor | 429/234 |
| 2,465,493 | 3/1949 | Strickhouser et al. | 429/147 |
| 2,607,810 | 8/1952 | Walker | 429/143 |
| 2,742,521 | 4/1956 | Duddy | 429/146 |
| 2,909,588 | 10/1959 | Rolph | 429/147 X |
| 2,925,456 | 2/1960 | Beusker et al. | 429/147 X |
| 3,350,484 | 10/1967 | Magill, Jr. | 429/143 X |
| 3,898,099 | 8/1975 | Baker et al. | 252/182.1 |
| 4,074,021 | 2/1978 | Aronson | 429/51 |
| 4,245,013 | 1/1981 | Clegg et al. | 429/147 X |

FOREIGN PATENT DOCUMENTS

| 951761 | 11/1949 | France . |
|---|---|---|
| 1045872 | 12/1953 | France . |
| 1243515 | 9/1960 | France . |
| 2266318 | 10/1975 | France . |
| 2313781 | 12/1976 | France . |

Primary Examiner—Anthony Skapars
Attorney, Agent, or Firm—Sughrue, Mion, Zinn, Macpeak & Seas

[57] ABSTRACT

Lead accumulator which comprises a plurality of elements each consisting of a negative plate, a positive plate and separating means intercalated between these plates, the said separating means comprising a first and a second microporous separator, between which spacers define channels, characterized in that the thickness of the channels (11) is between 0.5 mm and 2 mm and in that the width of the channels (11) is between 2 mm and 10 mm.

Particularly valuable application in traction batteries.

12 Claims, 4 Drawing Figures

LEAD ACCUMULATOR

FIELD OF THE INVENTION

The present invention relates to a lead accumulator which can be used, in particular, in traction batteries.

BACKGROUND OF THE INVENTION

In very simplified terms, an accumulator of this type comprises a plurality of elements each consisting of a negative plate, a positive plate and separating means intercalated between these plates.

The production of an accumulator of high energy-to-weight ratio, which is very durable, presents a fundamental technical problem. Thus, in particular, it is necessary to find a means of improving the efficiency of the active materials whilst at the same time preventing them from swelling and preventing the positive material from shedding; it is also necessary to reduce the corrosion of the grids holding these active materials.

The separating means of the accumulator play a very important part in improving all the abovementioned factors. Numerous types of separating means comprising microporous separators have already been proposed.

SUMMARY OF THE INVENTION

The object of the present invention is to produce a lead accumulator comprising microporous separators which are arranged so that they provide a distinct improvement from the point of view of durability.

The present invention relates to a lead accumulator which comprises a plurality of elements each consisting of a negative plate, a positive plate and separating means intercalated between these plates. The separating means consists of a first and a second microporous separator, between which spacers define channels. The invention is characterised in that the thickness of the channels is between 0.5 mm and 2 mm and in that the width of the channels is between 2 mm and 10 mm.

If the positive and negative plates of the accumulator have a height of between 100 mm and 300 mm, the thickness of the channels is preferably between 0.7 mm and 2 mm. If these plates have a height of between 300 mm and 600 mm, the thickness of the channels is preferably between 1 mm and 2 mm.

The width of the channels is preferably between 3 mm and 7 mm. These characteristics make it possible to obtain an accumulator of satisfactory energy-to-volume ratio, which has a longer life than the accumulators of the prior art.

According to a first embodiment, the spacers are produced by ribs present on one of the said separators. According to a preferred embodiment, the first separator, applied against the negative plate, comprises first ribs on its face turned towards the positive plate, and the said second separator, applied against the positive plate, comprises second ribs on its face turned towards the negative plate. The first and the second ribs are parallel to one another; the gap between two ribs on one and the same separator is between 5 mm and 20 mm. The two separators are preferably identical and the ribs on one separator bear on the other separator in the gap separating two of the ribs on the latter. The thickness of a rib is between 0.5 mm and 3 mm.

In all these variants, the channels, which are vertically orientated (in the normal use position of the accumulator), enable the electrolyte and the gases to circulate and thus enable the active materials to function homogeneously over the whole surface of the plates. Preferably, a device for forced circulation of the electrolyte is associated with the accumulator.

Furthermore, the faces of the first and the second separators which are respectively in contact with the positive and negative plates preferably possess mutually parallel grooves which are separated by a distance of between 0.8 mm and 1.4 mm and which allow the gases to be discharged more easily, in particular during recharging.

The separation can be filled by at least one glass wool sheet interposed between the second separator and the positive plate. The microporous separators or the glass wool sheets can be extended so as to surround the edges of the plates.

According to a particularly advantageous embodiment, the active material of the positive plates is consolidated by a plastic binder of the PTFE type, the proportion by weight of PTFE being between 0.5% and 2.5%.

Further characteristics and advantages of the present invention will become apparent during the following description which will refer to the attached drawings given by way of illustration but without implying a limitation.

DESCRIPTION OF THE PREFERRED EMBODIMENT

Figure 1:
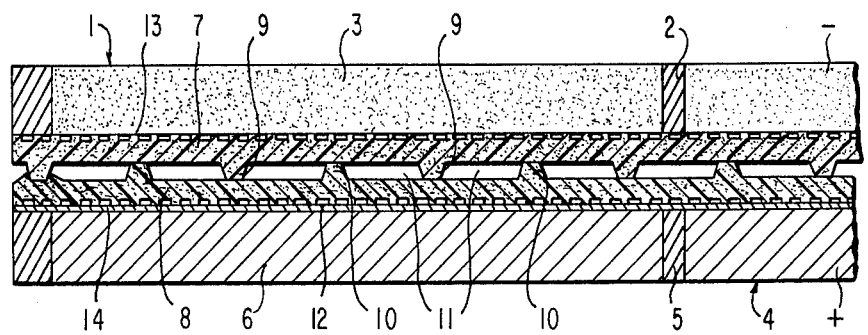
FIG. 1 is a very simplified partial view, in section, of a positive plate, a negative plate and the separating means according to the invention which are associated therewith.

FIG. 1 shows a negative plate 1 with its grid 2 and its active material 3, and a positive plate 4 with its grid 5 and its active material 6. The plates have a height of 175 mm. A microporous PVC separator 7, arranged against the negative plate 1, comprises mutually parallel ribs 9 on its face turned towards the positive plate 4; a glass wool sheet 12 is applied against the positive plate 4, and a microporous PVC separator 8 is interposed between the separator 7 and the sheet 12. The separator 8 comprises ribs 10 which are parallel to one another and parallel to the ribs 9, and offset with ribs 20 so as to define channels 11 (which are vertical in the normal use position of the accumulator) for enabling the electrolyte to circulate. The separators 7 and 8 are preferably identical; the lateral distance between two ribs 9 or 10 is equal to about 10 mm; the thickness of a rib 9 or 10 is of the order of 0.7 mm, the total thickness of one microporous separator is of the order of 1.5 mm and the total thickness of the two separators 7 and 8 is of the order of 2.25 mm.

The channels defined by the separators thus have a thickness of the order of 0.7 mm and a width of the order of 4 mm.

The faces 13 and 14 of the separators 7 and 8 possess fine mutually parallel grooves separated by a distance which is of the order of a millimeter and which can be between 0.8 mm and 1.4 mm.

EXAMPLE I

Two accumulators A and B, having a nominal capacity Cn of 54 Ah over 5 hours and each comprising four negative plates 1 and three positive plates 4, are produced.

The accumulator A according to the prior art is fitted with separating means consisting of a separator 7 and a glass wool sheet 12.

The accumulator B according to the invention is constructed according to the diagram of FIG. 1.

These two accumulators were subjected to charging-/discharging cycles defined in the following manner: charging was carried out at a rate of Cn/4 for 2 hours and then at a rate of Cn/10 for 3 hours; discharging was carried out at a rate of Cn/4 to a lower discharging limit of 0.7 Cn.

Figure 2:
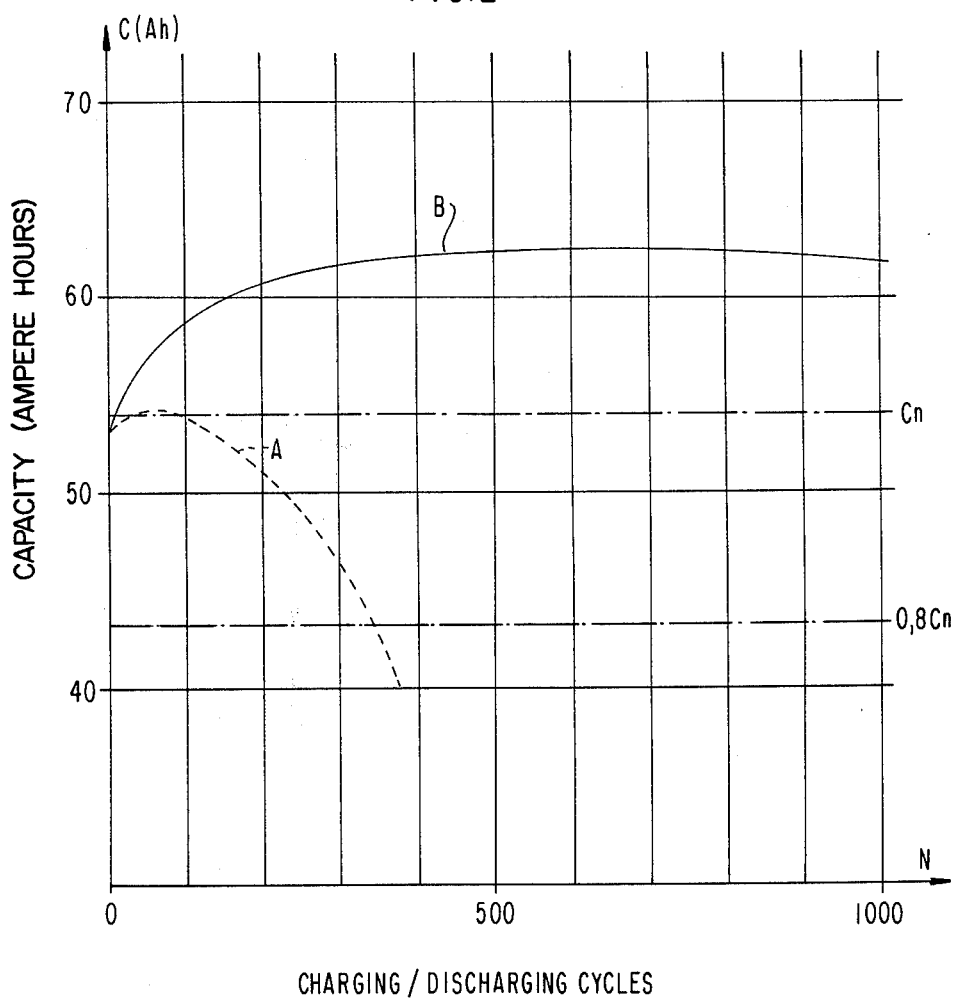
FIGS. 2, 3 and 4 show graphs representing the durability of the accumulators of the prior art and the accumulators according to the invention.

In FIG. 2, the graphs A and B relating to the accumulators A and B represent the variations in the capacity C, in ampere hours, as a function of the number of cycles N. The graph B stops at 1,000 cycles but the experiments continue. It is already possible to see the progress achieved by the structure of FIG. 1 from the point of view of the durability of the battery.

EXAMPLE II

Four accumulators D, $E_1$, $E_2$ and $E_3$ corresponding to the following characteristics are produced:

D and $E_1$ differ respectively from the accumulators A and B by the fact that the active material of their positive plates 4 is consolidated using a binder of the PTFE type, the weight ratio of PTFE to active material being of the order of 2.5%.

Figure 3:
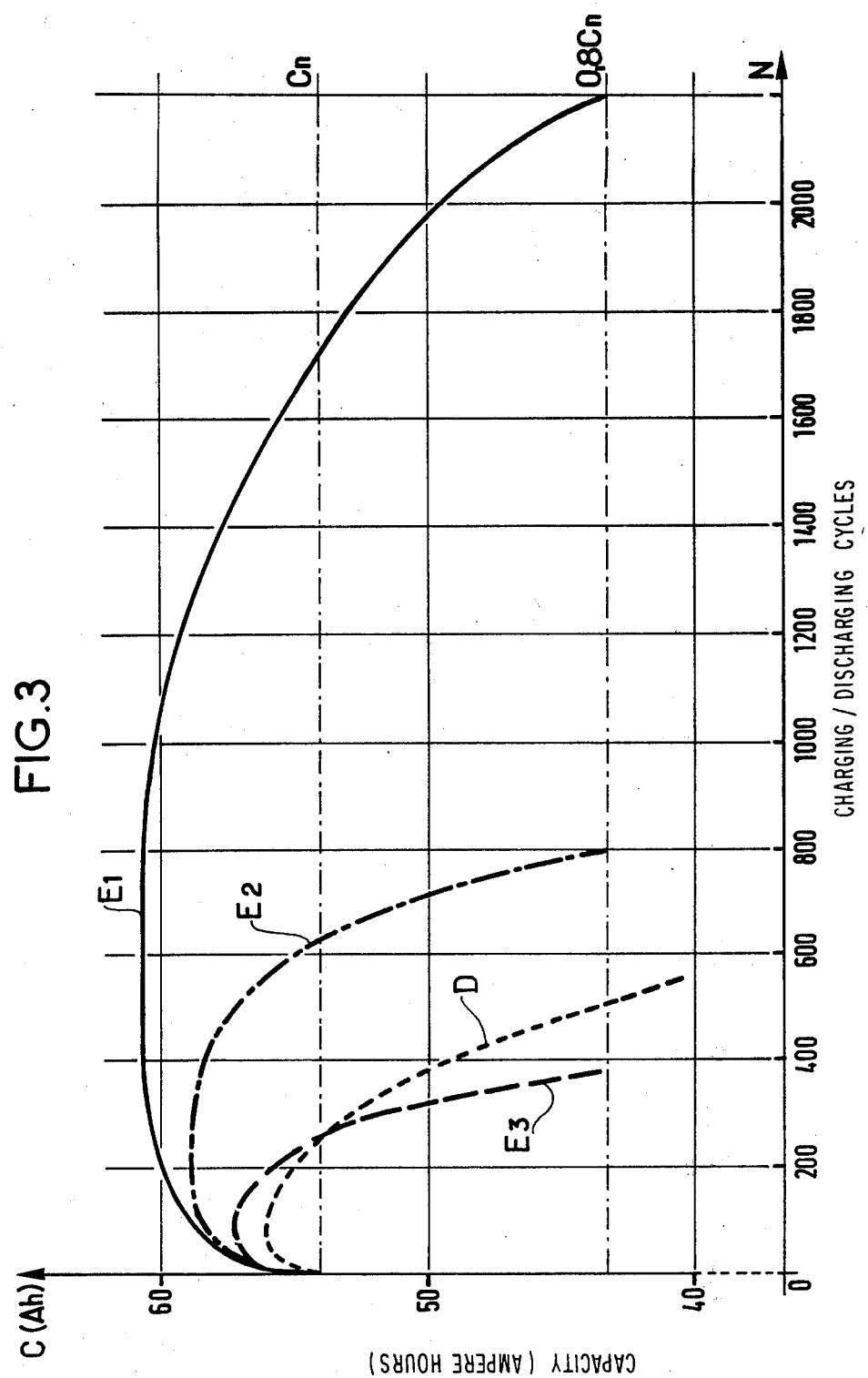
Figure 4:
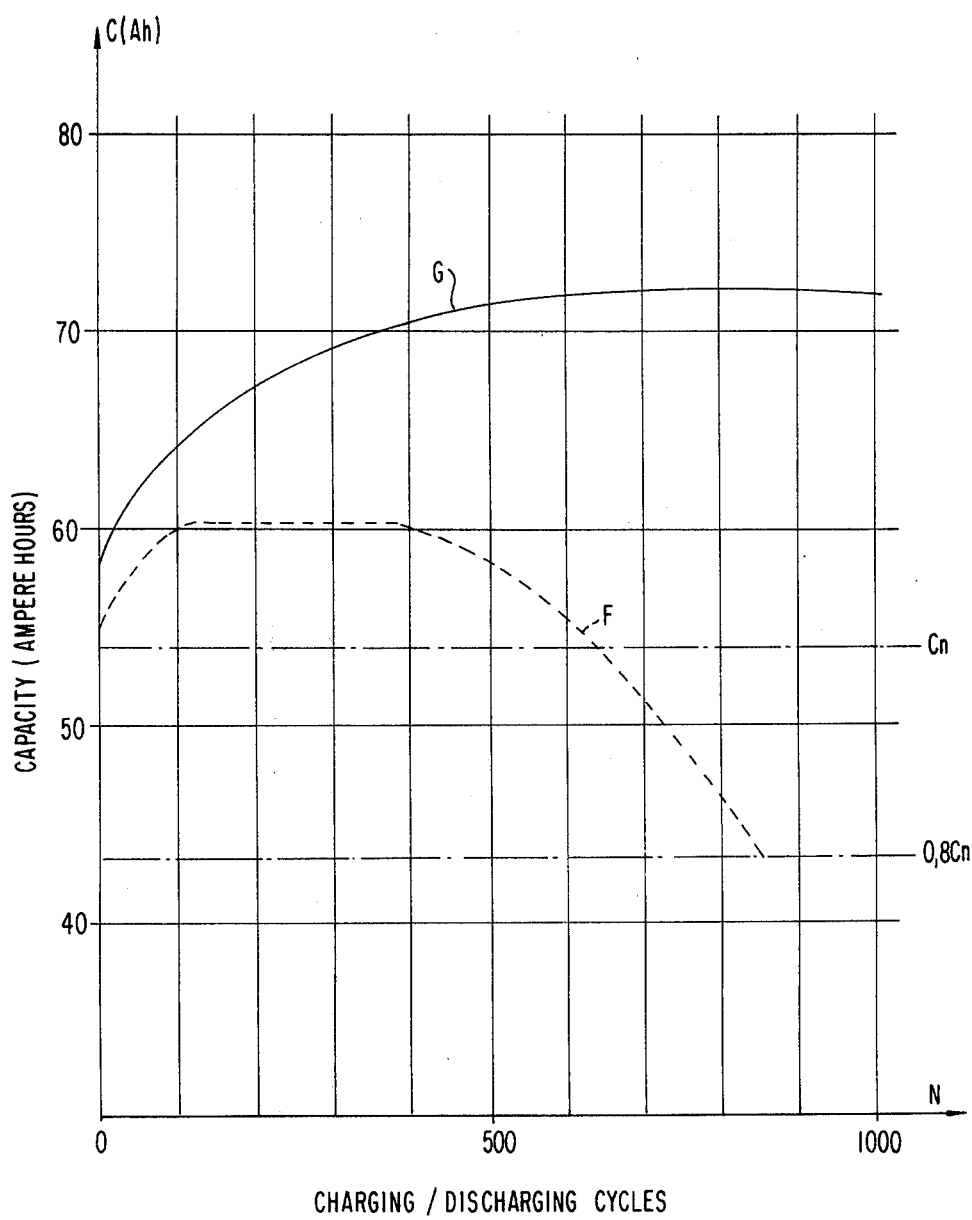

The graphs D and $E_1$ of FIG. 3 confirm the value of the separating means of FIG. 1, together with the value of the binder for consolidating the positive active material, from the point of view of durability.

The accumulators $E_2$ and $E_3$ show the same arrangement as the accumulator $E_1$, but they differ therefrom in the dimensions of the channels defined by their separators. Thus, in the case of $E_2$, the thickness of a channel is 0.35 mm and its width is 4 mm; in the case of $E_3$, the thickness of a channel is 0.7 mm and its width is 11 mm. The graphs $E_2$ and $E_3$ of FIG. 2 clearly show the deterioration in the performances of the accumulator when the dimensions of the channels exceed the limits envisaged according to the invention.

In the case of accumulators of which the plates have heights of more than 300 mm and less than 600 mm, channels having a thickness of more than 1 mm must preferably be used in order to obtain good results.

EXAMPLE III

Two accumulators F and G are produced, which are respectively similar to the accumulators D and $E_1$, but in which a device for forced circulation of the electrolyte, with a flow rate of a few liters per hour, is provided. The graphs F and G, of the same type as the graphs of FIGS. 2 and 3, illustrate the improvement in the durability of the accumulators when all the aspects of the invention are combined.

Of course, the invention is not limited to the examples which have now been described. In particular, it is possible to replace one of the separators by a plane separator, the gap between two ribs on the second separator being reduced by half.

In all cases, the two microporous separators respectively applied against the positive and negative plates oppose the swelling of the active materials; the channels having a thickness of more than 0.5 mm, which are defined by these separators, ensure the uniformity of the electrolyte concentrations, and their grooves assist the discharge of the gases.

We claim:

1. In a lead accumulator comprising a plurality of elements, each element consisting of a negative plate, a positive plate and separating means intercalated between said plates, said separating means comprising first and second microporous separators including spacers defining channels therebetween, the improvement wherein:

the positive plate (4) and the negative plate (1) have a height between 100 mm and 600 mm, each microporous separator has a thickness of approximately 1.5 mm, the thickness of the channels (11) is between 0.5 mm and 2 mm and wherein the width of the channels (11) is between 2 mm and 10 mm.

2. Accumulator according to claim 1, wherein said width of said channels (11) is between 3 mm and 7 mm.

3. Accumulator according to claim 1, wherein faces of said separators (7, 8) are respectively in contact with the negative and positive plates (1, 4) and possess mutually parallel grooves (13, 14) separated by a distance of between 0.8 mm and 1.4 mm.

4. Accumulator according to claim 1 or 2, wherein said spacers are produced by ribs present on one of said separators.

5. Accumulator according to claim 1 or 2, wherein said first separator (7) is applied against the negative plate (1), and possesses first ribs (9) on its face turned towards the positive plate (4), and said second separator (8) is applied against the positive plate (4), and possesses second ribs (10) laterally spaced from said first ribs and formed on its face turned towards the negative plate (1), said mutually parallel first and second ribs producing said spacers.

6. Accumulator according to claim 5, wherein said first and said second separator are identical.

7. Accumulator according to claim 5, wherein the gap separating two of said ribs (9, 10) on one and the same separator is between 5 mm and 20 mm.

8. Accumulator according to claim 5, wherein the thickness of one of said ribs (9, 10) is between 0.5 mm and 3.5 mm.

9. Accumulator according to claim 1, further comprising a device for forced circulation of the electrolyte.

10. Accumulator according to claim 9, wherein the flow rate of electrolyte is of the order of a few liters per hour.

11. Accumulator according to claim 1, wherein the active material of said positive plate is consolidated by a plastic binder.

12. Accumulator according to claim 11, wherein the proportion by weight of said binder in said positive active material is between 0.5% and 2.5%.

* * * * *